(12) United States Patent
Yopp et al.

(10) Patent No.: US 9,409,549 B2
(45) Date of Patent: Aug. 9, 2016

(54) AUTONOMOUS VEHICLE WINDOW CLEARING

(71) Applicant: Ford Global Technologies, LLC, Dearborn, MI (US)

(72) Inventors: Wilford Trent Yopp, Canton, MI (US); Mark Allan Lippman, New Baltimore, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 181 days.

(21) Appl. No.: 14/036,159

(22) Filed: Sep. 25, 2013

(65) Prior Publication Data

US 2015/0088374 A1   Mar. 26, 2015

(51) Int. Cl.
*B60S 1/04* (2006.01)
*B60H 1/00* (2006.01)
*B60S 1/02* (2006.01)
*B60S 1/08* (2006.01)

(52) U.S. Cl.
CPC .............. *B60S 1/04* (2013.01); *B60H 1/00764* (2013.01); *B60H 1/00785* (2013.01); *B60S 1/023* (2013.01); *B60S 1/0818* (2013.01); *B60H 1/00878* (2013.01)

(58) Field of Classification Search
CPC  B60H 1/00785; B60H 1/00878; B60S 1/023; B60S 1/04; B60S 1/0818
See application file for complete search history.

(56) References Cited

U.S. PATENT DOCUMENTS

| | | | | |
|---|---|---|---|---|
| 4,960,996 A * | 10/1990 | Hochstein | ............ | B60S 1/0822 15/250.001 |
| 4,975,978 A | 12/1990 | Ando et al. | | |
| 5,323,637 A * | 6/1994 | Bendicks | ............ | B60S 1/0822 318/119 |
| 5,414,257 A * | 5/1995 | Stanton | ................ | B60S 1/0822 250/227.25 |
| 5,498,866 A * | 3/1996 | Bendicks | ............ | B60S 1/0822 250/227.25 |
| 5,703,568 A * | 12/1997 | Hegyi | ................... | B60S 1/0818 15/250.01 |
| 5,811,793 A * | 9/1998 | Pientka | ................ | B60S 1/0837 250/216 |
| 5,998,782 A * | 12/1999 | Koyama et al. | ......... | 250/227.25 |
| 6,151,539 A * | 11/2000 | Bergholz et al. | ................ | 701/25 |
| 6,353,392 B1 | 3/2002 | Schofield et al. | | |
| 2007/0227718 A1 | 10/2007 | Hill et al. | | |
| 2009/0299547 A1* | 12/2009 | Becker et al. | ...................... | 701/1 |
| 2011/0010045 A1* | 1/2011 | Yopp | ..................... | B60S 1/0818 701/36 |
| 2012/0020102 A1* | 1/2012 | Lambert et al. | ............... | 362/503 |
| 2012/0218412 A1 | 8/2012 | Dellantoni et al. | | |
| 2013/0141574 A1* | 6/2013 | Dalal et al. | ..................... | 348/148 |
| 2013/0219294 A1 | 8/2013 | Goldman-Shenhar et al. | | |
| 2014/0307247 A1* | 10/2014 | Zhu | ....................... | G01S 17/023 356/4.01 |
| 2014/0336935 A1* | 11/2014 | Zhu | ......................... | G01W 1/14 702/3 |

FOREIGN PATENT DOCUMENTS

| | | |
|---|---|---|
| DE | 4426610 | 9/1995 |
| DE | 10136138 | 2/2003 |

OTHER PUBLICATIONS

Kahle et al., Preheat: Automatic Windshield Defroster, Olin Projects, May 2013, http://www.olinprojects.com/ projects/ 5187d431e885afce55818c13.

\* cited by examiner

*Primary Examiner* — Mussa A Shaawat
(74) *Attorney, Agent, or Firm* — Frank MacKenzie; Bejin Bieneman PLC

(57) ABSTRACT

At least one datum is received relating to a condition of a window in the vehicle. A determination is made to change a parameter based on the at least one datum, the parameter governing clearing the window. An instruction is provided to initiate or change operation of a vehicle component based on the change of the parameter.

19 Claims, 2 Drawing Sheets

AUTONOMOUS VEHICLE WINDOW CLEARING

BACKGROUND

A vehicle such as an automobile may be configured for autonomous driving operations. For example, the vehicle may include a central control unit or the like, i.e., the computing device having a processor and a memory, that receives data from various vehicle data collection devices such as sensors and generally also external data sources such as navigation information. The central control unit may then provide instructions to various vehicle components, e.g., actuators and the like that control steering, braking, acceleration, etc., to control vehicle operations without action, or with reduced action, by a human operator.

An autonomous vehicle may carry one or more occupants. An occupant of an autonomous vehicle may or may not have a need to see out of the vehicle. Further, an autonomous vehicle occupant may or may not be sitting in a driver's seat of the autonomous vehicle. However, even when an autonomous vehicle occupant does not need to see out of the vehicle for purposes of operating or controlling the vehicle, the occupant may wish to view the surrounding environment. Further, there may be times when an autonomous vehicle occupant desires or needs to view outside of an autonomous vehicle to perform certain operations and/or to determine whether to exercise control over the vehicle.

DRAWINGS

DETAILED DESCRIPTION

System Overview

Figure 1:
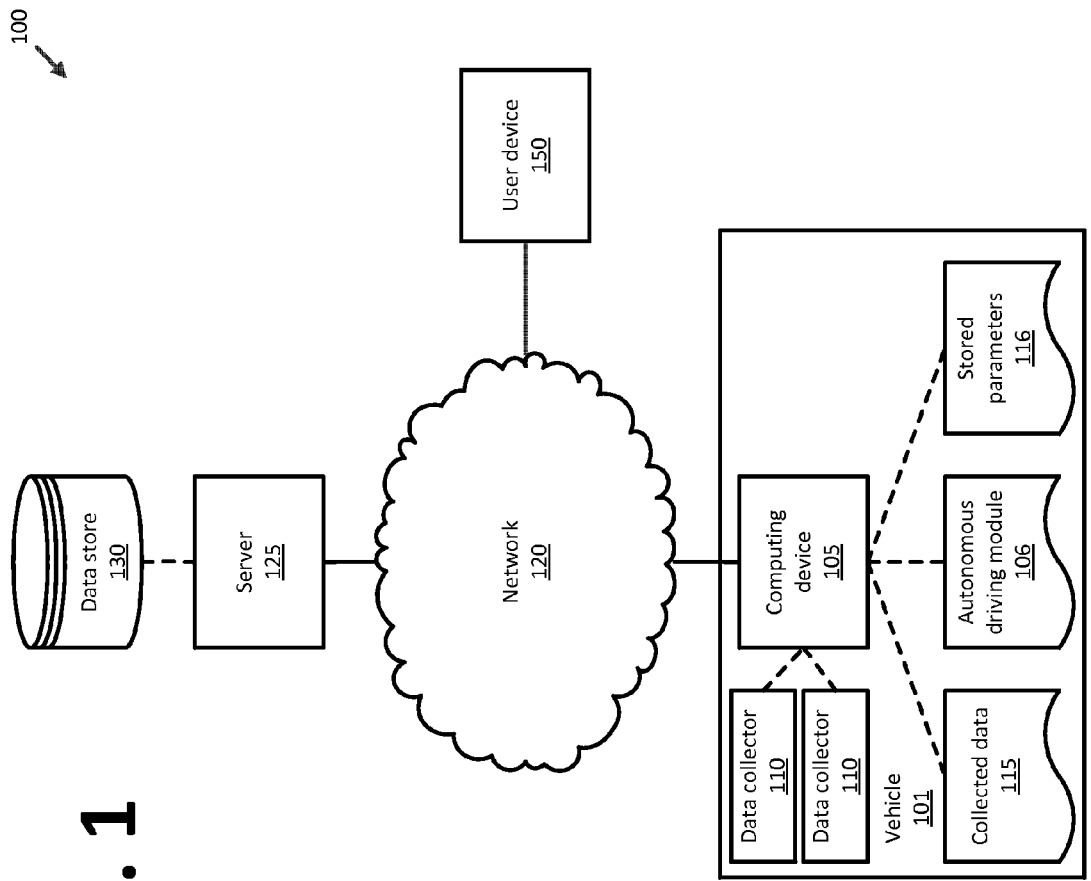
FIG. 1 is a block diagram of an exemplary autonomous vehicle system including monitoring and control of window clearing mechanisms.

FIG. 1 is a block diagram of an exemplary autonomous vehicle system 100 including monitoring and control of window clearing mechanisms. A computer 105 may be configured for communicating with one or more remote sites such as a server 125 via a network 120, such remote site possibly including a data store 130. A vehicle 101 includes the vehicle computer 105 that is configured to receive information, e.g., collected data 115, from one or more data collectors 110 related to various components or conditions of the vehicle 101, e.g., components such as a steering system, a braking system, a powertrain, etc., and/or conditions such as moisture, dirt, debris, and/or other materials that may adhere to and/or obscure vehicle 101 windows. In the context of this disclosure, a vehicle window may be any window in a vehicle, such as a windshield, side window, rear window, roof window, etc.

The computer 105 generally includes an autonomous driving module 106 that comprises instructions for autonomously, i.e., without operator input, operating the vehicle 101, including possibly in response to instructions received from a server 125. Further, the computer 105, e.g., in the module 106, generally includes instructions for receiving data, e.g., from one or more data collectors 110 and/or a human machine interface (HMI), such as an interactive voice response (IVR) system, a graphical user interface (GUI) including a touchscreen or the like, etc.

Window monitoring and control in the vehicle 101 may be governed by one or more stored window parameters 116. By evaluating collected data 115 with respect to one or more stored parameters 116 being used during autonomous driving operations, the computing device 105 can determine whether to adjust one or more of the parameters 116. For example, the module 106 may, based on collected data 110, change parameters 116 related to an on/off state of a windshield wiper, a defrost function, vehicle 101 climate control settings, etc.

Exemplary System Elements

A vehicle 101 includes a vehicle computer 105 that generally includes a processor and a memory, the memory including one or more forms of computer-readable media, and storing instructions executable by the processor for performing various operations, including as disclosed herein. Further, the computer 105 may include more than one computing device, e.g., controllers or the like included in the vehicle 101 for monitoring and/or controlling various vehicle components, e.g., an engine control unit (ECU), transmission control unit (TCU), etc. The computer 105 is generally configured for communications on a controller area network (CAN) bus or the like. The computer 105 may also have a connection to an onboard diagnostics connector (OBD-II). Via the CAN bus, OBD-II, and/or other wired or wireless mechanisms, the computer 105 may transmit messages to various devices in a vehicle and/or receive messages from the various devices, e.g., controllers, actuators, sensors, etc., including data collectors 110. Alternatively or additionally, in cases where the computer 105 actually comprises multiple devices, the CAN bus or the like may be used for communications between devices represented as the computer 105 in this disclosure. In addition, the computer 105 may be configured for communicating with the network 120, which, as described below, may include various wired and/or wireless networking technologies, e.g., cellular, Bluetooth, wired and/or wireless packet networks, etc.

Generally included in instructions stored in and executed by the computer 105 is an autonomous driving module 106. Using data received in the computer 105, e.g., from data collectors 110, the server 125, etc., the module 106 may control various vehicle 101 components and/or operations without a driver to operate the vehicle 101. For example, the module 106 may be used to regulate vehicle 101 speed, acceleration, deceleration, steering, operation of components such as lights, windshield wipers, etc. Further, the module 106 may include instructions for evaluating information received in the computer 105 relating to vehicle 101 operator characteristics, e.g., from an HMI and/or data collectors 110.

Data collectors 110 may include a variety of devices. For example, various controllers in a vehicle may operate as data collectors 110 to provide data 115 via the CAN bus, e.g., data 115 relating to vehicle speed, acceleration, etc. Further, sensors or the like, global positioning system (GPS) equipment, etc., could be included in a vehicle and configured as data collectors 110 to provide data directly to the computer 105, e.g., via a wired or wireless connection. Sensor data collectors 110 could include mechanisms such as RADAR, LADAR, sonar, etc. sensors that could be deployed to measure a distance between the vehicle 101 and other vehicles or objects. In the context of the system 100 for monitoring and controlling vehicle 101 windows, sensor data collectors could include known sensing devices such as cameras, laser devices, moisture sensors, etc. to detect vehicle 101 window conditions, such as moisture, frost, ice, dirt, salt, debris, etc.

For example, an interior camera data collector 110 could provide computer 105 with an image of a vehicle 101 window. The computer 105 may include instructions to use image recognition techniques to determine whether the vehicle 101 window is clean, dirty, frosty, wet, etc., e.g., by comparing a captured image to that of an image representing a clean vehicle 101 window. Additionally, other image processing techniques such as are known could be used, e.g., optical flow to monitor patterns outside of the vehicle 101 when it is in motion to indicate that a window is clear.

Alternatively or additionally, a laser sensor data collector 110 could be used to provide collected data 115 for determining a state of a window. For example, low cost laser sensors are known that may be used as laser sensor data collectors 110. For example, a low power, short range laser sensor data collector 101 could be installed in a vehicle 101 dash board so as to detect and identify common materials that would likely interfere with visibility through a vehicle 101 window. Further, such a laser sensor data collector 110 would include a distance measuring capability that would allow the computer 105 to determine if a detected material is on an interior or exterior vehicle 101 window surface. Such determination could be accomplished by measuring the time of flight of the laser signal (i.e., a time from the signal being sent out to its detected return), and knowing the position of the laser sensor with respect to the window. When there is material that collects on the window that would cause a reflection, such as dirt, snow, etc. the time of flight is small and the distance can be calculated. This calculated distance can be compared to a known window location to determine if the window is obscured.

In one implementation of a laser sensor data collector 110, a laser emitter and laser sensor module is mounted inside a vehicle 101 in a fixed position so as to target a fixed position reflective surface (i.e., metal surface) outside the vehicle 101. For example, the laser could be aimed at a part of a vehicle 101 windshield wiper mechanism that is fixed in a position or at a reflective surface specifically located in a place to act as a reflective surface, directing the laser beam back to the sensor included in the data collector 110 inside the vehicle 101. This target reflective surface could be placed so as to provide space between the vehicle 101 window and the target surface. A laser beam may then be initiated and will emit a beam to the target surface that is reflected back to the laser sensor. The laser sensor then provides an electrical signal level based on the laser beam it receives. This continuous feedback of reflective signals provides a constant monitoring of the functionally of the sensor and the window surface.

Further, the use of a Laser Triangulation Sensor allows for the target position to be detected. A beam of light is emitted to a fixed reference target and the resulting signal is based on the position of the beam received by a CCD (charge coupled device) sensor data collector 110. As long as the beam is detected in its reference position on the CCD sensor, it can be determined that no obstacles exist in the laser beam path. If the laser beam moves position or is no longer detected by the CCD, it can be determined that some material has interfered with the path of the laser beam and position of the material may be determined by the beam position received by the CCD sensor. For example, if a frost is built up on the inside or outside of a vehicle 101 windshield, the beam reflected to the CCD sensor will move to a position consistent to being reflected by something at that distance. On the other hand, if snow has built up on the surface of the target the reflected signal will be received in a shorter time, but not as short as that in the case of the window being blocked. In the case that snow also covers the outside of the window, the returned signal may be similar to that in the case of a frosted window. In case where snow covers the outside of the window, automatic defrost and/or wiper cycles could be initiated.

A laser sensor data collector 110 designed to measure distance is generally a time-based system. The laser transmitter emits a beam to a reference target as discussed above and the amount of time elapsed for the beam to travel from the emitter to the target reflective surface and back to the sensor, indicates the distance between them. If a material breaks the beam path it can be determined at what distance this material is from the sensor. For example if frost is built up on the inside of a vehicle 101 windshield, the distance measured by the laser sensor data collector 110 will be consistent with the known value of distance between the inside of the windshield and the laser sensor module. From such collected data 115 it can be determined that the inside window surface is fogged or frosted and needs treatment to allow visibility.

Because a laser may not generate sufficient reflection from clear water to consistently detect rain, a laser data collector could be used in conjunction with a conventional rain sensor data collector to detect rain. Advantageously, the sensor data collectors 110 disclosed herein, e.g., cameras and lasers, may, as mentioned above, be mounted in an interior of a vehicle 101 thereby avoiding direct contact with external environments and avoiding contact with external dirt, debris, etc. However, external viewing sensor data collectors 110 on the vehicle may also have a view of the vehicle 101 windows and could use the same types of techniques as described above to determine if a window is obscured. Similarly, such external viewing sensor data collectors 110 could also detect the state of windows on other vehicles that it comes near and report their status to the server 125 via the network 120.

A memory of the computer 105 generally stores collected data 115. Collected data 115 may include a variety of data collected in a vehicle 101. Examples of collected data 115 are provided above, and moreover, data 115 is generally collected using one or more data collectors 110 as described above, and may additionally include data calculated therefrom in the computer 105, and/or at the server 125. In general, collected data 115 may include any data that may be gathered by a collection device 110 and/or computed from such data. Accordingly, collected data 115 could include a variety of data related to vehicle 101 operations and/or performance, as well as data related to environmental conditions, road conditions, etc. relating to the vehicle 101. For example, collected data 115 could include data a state or states of one or more vehicle 101 windows. For example, a rear window could be covered and need to be cleaned, or the driver could have indicated that the roof window is of no concern.

A memory of the computer 105 may further store window parameters 116. A parameter 116 generally governs control of a vehicle 101 component related to a state of one or more vehicle 101 windows. Some examples of parameters 116 and possible values therefor are provided below in Table 1:

TABLE 1

| Parameter | Values |
| --- | --- |
| Windshield wiper on/off | on/off |
| Windshield wiper speed | high/low/interval |
| Use washing fluid (if wiper on) | yes/no |
| Windshield defrost on/off | on/off |
| Windshield defrost settings | range from high to low, could specify target glass temperature |

TABLE 1-continued

| Parameter | Values |
| --- | --- |
| Rear defrost on/off | on/off |
| Rear defrost settings | range from high to low, could specify temperature |
| Side window defrost on/off | on/off |
| Side window defrost settings | range from high to low, could specify temperature |
| Target interior humidity | % air moisture |
| Interior vehicle temperature thermostat setting | Temperature in degrees Fahrenheit or Celsius |

In general, the computer 105 may store a set of default parameters 116 for a vehicle 101 and/or for a particular user of a vehicle 101. Further, parameters 116 may be varied according to a time of year, time of day, etc. For example, at night, parameters 116 could be adjusted to not keep all windows clear, or at cold times of year, defrost settings could be more sensitive than at warmer times of year, etc. Moreover, parameters 116 could be downloaded from and/or updated by the server 125. For example, the data store 130 could maintain preferred parameters 116 for a vehicle 101 occupant so that when the occupant moved from a first vehicle 101 to a second vehicle 101 the occupant's preferred parameters 116 could be provided in the second vehicle 101.

Continuing with FIG. 1, the network 120 represents one or more mechanisms by which a vehicle computer 105 may communicate with a remote server 125. Accordingly, the network 120 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The server 125 may be one or more computer servers, each generally including at least one processor and at least one memory, the memory storing instructions executable by the processor, including instructions for carrying out various steps and processes described herein. The server 125 may include or be communicatively coupled to a data store 130 for storing collected data 115 and/or parameters 116. For example, collected data 115 relating to road conditions, weather conditions, etc. could be stored in the data store 130. Such collected data 115 from a vehicle 101 could be aggregated with collected data 115 from one or more other vehicles 101, and could be used to provide suggested modifications to parameters 116 being provided to one or more other vehicles 101. To continue this example, collected data 115 could indicate a geographic location of a vehicle 101, e.g., geo-coordinates from a global positioning system (GPS) in the vehicle 101, whereby the server 125 could provide parameters 116 tailored for conditions in a geographic area of the vehicle 101. For example, parameters 116 could be tailored for rain conditions, snow conditions, fog, etc. In general, parameters 116 could be provided from the data store 130 via the server 125. For example, parameters 116 could be updated for a particular vehicle 101 or type of vehicle 101, and then the updated parameters 116 could be provided to the computer 105.

A user device 150 may be any one of a variety of computing devices including a processor and a memory, as well as communication capabilities. For example, the user device 150 may be a portable computer, tablet computer, a smart phone, etc. that includes capabilities for wireless communications using IEEE 802.11, Bluetooth, and/or cellular communications protocols. Further, the user device 150 may use such communication capabilities to communicate via the network 120 and also directly with a vehicle computer 105, e.g., using Bluetooth. Accordingly, a user device 150 may be used to carry out certain operations herein ascribed to a data collector 110, e.g., voice recognition functions, cameras, global positioning system (GPS) functions, etc., in a user device 150 could be used to provide data 115 to the computer 105. Further, a user device 150 could be used to provide a human machine interface (HMI) to the computer 105.

Exemplary Process Flows

Figure 2:
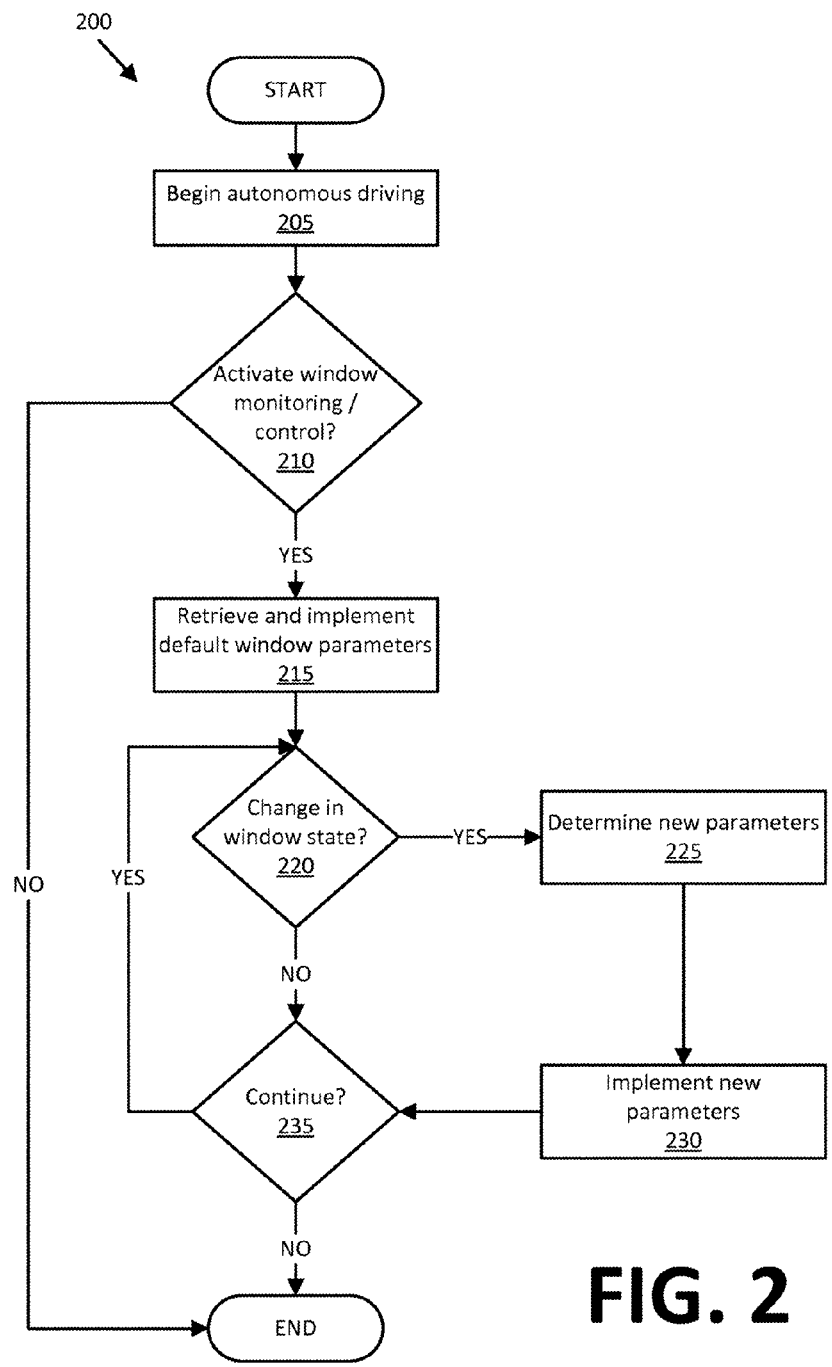
FIG. 2 is a diagram of an exemplary process for monitoring and controlling window clearing mechanisms in an autonomous vehicle.

FIG. 2 is a diagram of an exemplary process 200 for monitoring and/or controlling window clearing functions in an autonomous vehicle.

The process 200 begins in a block 205, in which the vehicle 101 commences autonomous driving operations, i.e., begins driving in a manner partially or completely controlled by the autonomous driving module 106. For example, all vehicle 101 operations, e.g., steering, braking, speed, etc., could be controlled by the module 106 in the computer 105. However, it is also possible that, in the block 205, the vehicle 101 may be operated in a partially autonomous (i.e., partially manual, fashion, where some operations, e.g., braking, could be manually controlled by a driver, while other operations, e.g., including steering, could be controlled by the computer 105.

Following the block 205, or substantially contemporaneously with, or even immediately preceding, the block 205, in a block 210 the computer 105 determines whether to activate monitoring and control of vehicle 101 window clearing. For example, the computer 105 may generally be configured to activate window monitoring and control upon commencing autonomous driving in the block 205. However, a vehicle 101 occupant could override such default, e.g., using an HMI interface or the like to the vehicle 101, or a vehicle 101 occupant could be prompted to specify whether the computer 105 should conduct window monitoring and/or clearing operations while the vehicle 101 is being autonomously operated. In any event, if the computer 105 determines that monitoring and control of vehicle 101 windows should not be performed, then the process 200 ends. Otherwise, the process 200 proceeds to a block 215.

In the block 215, the computer 105 retrieves and implements default parameters 116 for vehicle 101 window clearing. For example, default parameters 116 may specify that windshield wipers, defrosters, etc. are to be off, and may generally assume that driver will have full control of the vehicle 101 windows. Further, the computer 105 may retrieve parameter 116 updates and/or modifications from the server 125 as discussed above. For example, the server 125 could provide parameter 116 modifications based on an unusual weather state, e.g., a vehicle 101 is starting its journey in a garage but the weather is unusually cold, making a vehicle 101 defroster immediately desirable, etc. Or, to take another example, it could be that the vehicle 101 has been outside in the cold and the driver has just entered the vehicle 101. By comparing the internal temperature of the vehicle and knowing the nominal temperature of a human's breath, the computer 105 could determine that immediate defrosting is desired to minimize or prevent fogging of the window.

Next, in a block 220, the computer 105 retrieves and evaluates collected data 115 from data collectors 110, and based on the collected data 115, possibly including calculations and/or evaluations of collected data 115 retrieved from the data collectors 110, determines whether a state of one or more vehicle 101 windows has changed from a state related to the default parameter or parameters 116 implemented in the block 215. For example, the computer 105 could determine that where windows were previously dry, they are now accumulating rain, condensation, frost, etc. If a state of one or more windows in the vehicle 101 has changed, then a block 225 is executed next. Otherwise, the process 200 proceeds to a block 235.

In the block 225, the computer 105 determines one or more new parameters, e.g., updates to the parameters implemented in the block 215, governing monitoring and maintenance of vehicle 101 windows. For example, a windshield wiper on/off parameter could be toggled from "off" to "on" when the window needs to be cleaned. Likewise the wiper parameter could be toggled from "on" to "off" once the cleaning operation is complete.

Further, a windshield wiper interval setting could be set based on a degree of rain. Likewise, a defroster could be set to "on," etc.

Next, in a block 230, the computer 105 implements the parameters determined in the block 225. That is, instructions are sent to one or more vehicle 101 components, e.g., a windshield wiper controller, a climate control system controlling a defroster, etc.

In the block 235, which may follow either the block 220 or the block 230, the computer 105 determines whether to continue the process 200. For example, the process 200 ends when autonomous driving operations end. Further, the computer 105 could receive input from a vehicle 101 occupant to end control and/or monitoring of vehicle 101 windows. In any event, if the process 200 is determined to continue, the process 200 returns to the block 220.

Conclusion

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising:
 a laser sensor arranged to provide at least one first datum obtained based on a laser beam directed at a window in a vehicle;
 one or more rain sensors, including at least one of a camera and a moisture sensor, arranged to provide at least one second datum based on a condition of the window in the vehicle; and
 a computer, the computer comprising a processor and a memory, wherein the computer is configured to:
  receive from the laser sensor the at least one first datum, and determine that the at least one first datum relates to a condition of at least an interior surface of the window;
  receive from the one or more rain sensors the at least one second datum;
  determine to change a parameter based on the at least one first datum and the at least one second datum, the parameter governing clearing the window; and
  provide an instruction to initiate or change operation of a vehicle component based on the change of the parameter.

2. The system of claim 1, wherein the at least one first datum includes an electrical signal intensity based on a received laser beam.

3. The system of claim 1, wherein the first parameter is one of a windshield wiper on/off setting, a windshield wiper interval setting, a defroster on/off setting, a defroster intensity setting, and a vehicle target temperature setting, and the vehicle component is one of a defroster, a windshield wiper, and a vehicle thermostat.

4. The system of claim 1, the computer being further configured to:
receive at least one third datum relating to a condition of the window in the vehicle;
determine to change a parameter based on the at least one further datum, the parameter governing clearing the window; and
providing an instruction initiate or change operation of the vehicle component based on the change of the parameter based on the at least one third datum.

5. The system of claim 4, wherein the parameter based on the at least one first datum, and the at least one second datum, and the parameter based on the at least one third datum are a same parameter related to a same component in the vehicle.

6. The system of claim 1, the computer being further configured to provide instructions for autonomously driving the vehicle.

7. A method, comprising:
receiving, from a laser sensor arranged to provide at least one first datum obtained based on a laser beam directed at a window in a vehicle, and determining that the at least one first datum relates to a condition of at least an interior surface of the window in the vehicle;
receiving, from one or more rain sensors, including at least one of a camera and a moisture sensor, arranged to provide at least one second datum based on a condition of the window in the vehicle;
determining to change a parameter based on the at least one first datum and the at least one second datum, the parameter governing clearing the window; and
providing an instruction to initiate or change operation of a vehicle component based on the change of the parameter.

8. The method of claim 7, wherein the at least one first datum includes an electrical signal intensity based on a received laser beam.

9. The method of claim 7, wherein the first parameter is one of a windshield wiper on/off setting, a windshield wiper interval setting, a defroster on/off setting, a defroster intensity setting, and a vehicle target temperature setting, and the vehicle component is one of a defroster, a windshield wiper, and a vehicle thermostat.

10. The method of claim 7, further comprising:
receiving at least further datum relating to a condition of the window in the vehicle;
determining to change a parameter based on the at least one further datum, the parameter governing clearing the window; and
providing an instruction initiate or change operation of a vehicle component based on the change of the parameter based on the at least one further datum.

11. The method of claim 10, wherein the parameter based on the at least one first datum and the parameter based on the at least one further datum are a same parameter related to a same component in the vehicle.

12. The system of claim 1, wherein, in addition to the at least one first datum, whether to change the parameter is based on is at least one of a vehicle humidity, a vehicle temperature, an intensity of a reflection of a light beam, and an indication from a rain sensor.

13. The system of claim 1, wherein the at least one first datum includes a position of a laser beam received by a charge coupled device.

14. The system of claim 13, wherein the computer is configured to identify a type of precipitation on the window according to the position of the laser beam identified by the charge coupled device.

15. The method of claim 7, wherein, in addition to the at least one datum, determining to change the parameter is based on at least one of a vehicle humidity, a vehicle temperature, an intensity of a reflection of a light beam, and an indication from a rain sensor.

16. The method of claim 7, wherein the at least one datum includes a position of a laser beam received by a charge coupled device.

17. The method of claim 16, further comprising identifying a type of precipitation on the window according to the position of the laser beam identified by the charge coupled device.

18. The system of claim 1, wherein the at least one first datum relating to the interior surface of the vehicle window indicates at least one of moisture and dirt.

19. The method of claim 7, wherein the at least one first datum relating to the interior surface of the vehicle window indicates at least one of moisture and dirt.

* * * * *